L. A. FOGG.

VEHICLE-SPRINGS.

No. 7,891. Reissued Sept. 18, 1877.

WITNESSES.

J. W. K. Smith

R. C. Marshall

INVENTOR

Lucius A. Fogg.

by Bakewell & Kerr

Attys

N. PETERS, PHOTO-LITHOGRAPHER, WASHINGTON, D. C.

UNITED STATES PATENT OFFICE.

LUCIUS A. FOGG, OF PARKER CITY, PENNSYLVANIA.

IMPROVEMENT IN VEHICLE-SPRINGS.

Specification forming part of Letters Patent No. 187,262, dated February 13, 1877; Reissue No. 7,891, dated September 18, 1877; application filed August 14, 1877.

*To all whom it may concern:*

Be it known that I, LUCIUS A. FOGG, of Parker City, in the county of Armstrong and State of Pennsylvania, have invented a new and useful Improvement in Vehicle-Springs; and I do hereby declare the following to be a full, clear, and exact description thereof, reference being had to the accompanying drawing, forming part of this specification, in which—

Figure 1:
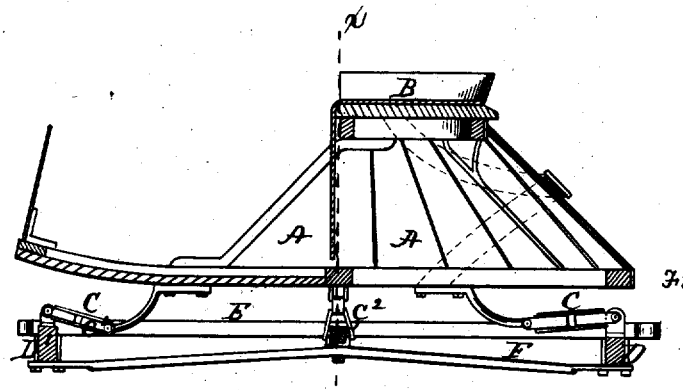
Figure 2:
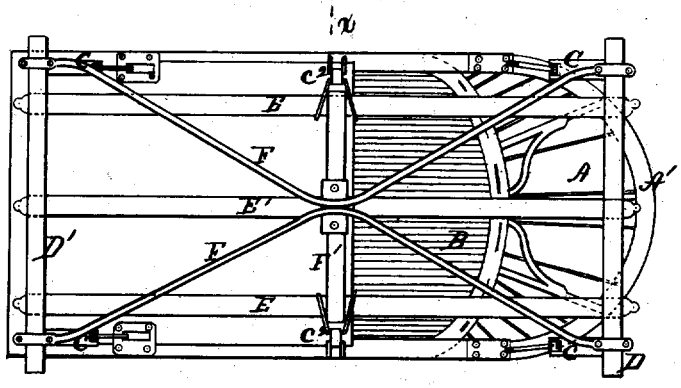
Figure 3:
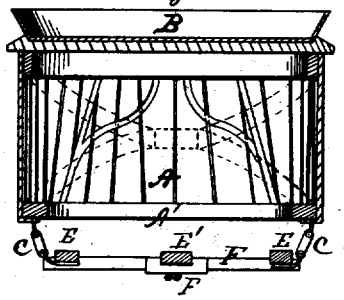
Figure 7:
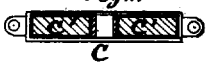
Figure 6:
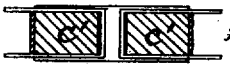
Figure 5:
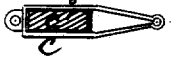
Figure 4:
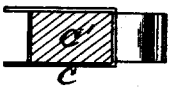
Figure 8:
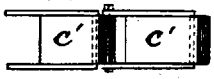

Figure 1 is a vertical longitudinal section of a buggy or light vehicle having my improvements applied. Fig. 2 is a plan view of the same as seen from below. Fig. 3 is a vertical section on the line *x x*, Fig. 1. Fig. 4 is a plan view of a single spring as employed by me, with a part of the metal removed to show the interior. Fig. 5 is a side view of a single spring with part of the box broken away. Fig. 6 is a plan view of a double spring. Fig. 7 is a side view, partly in section. Fig. 8 is a plan view of two single springs, showing the method of combining two or more springs to form a compound spring or elastic chain.

Like letters refer to like parts wherever they occur.

My invention relates to the construction of spring-vehicles; and consists in connecting and combining the running-gear of vehicles with the body or bed by interposed compressible springs and suspension-arms or brackets, so that the power of the spring increases in proportion with the increase of the superimposed weight, the springs also acting as buffers to deaden or overcome sudden shocks, and the suspension-arms counteracting the shock, which would be communicated from the gear were the body not so suspended.

The object of this invention is to simplify and cheapen the cost of construction of spring-vehicles, as well as to render them more durable, and better adapted for rough roads and heavy loads, and is especially applicable to perch-vehicles, or those wherein the rocker-head block or spring-bar and hind axle are rigidly connected.

I will now proceed to describe my invention, so that others skilled in the art to which it appertains may apply the same.

C is a spring, made of two or more flat pieces of metal, in the form of a box, the parts being interlocked, and the space between them being filled with rubber or other elastic material $C^1$. This is called a single spring. In some cases two half-boxes are interlocked with a third piece of a similar character, thus making two spaces, both filled with rubber. This is called a double spring. Or, if desired, two or more springs can be attached to each other, forming a compound spring or chain, as shown in Fig. 8. The rubber space may be completely filled with the rubber $C^1$, or the rubber may be notched or partially cut away to regulate the elasticity of the spring. Such, or springs having similar action, are interposed between the running-gear and bed as follows: The springs C C are attached at one end to the upper parts of the hinder axle-tree D and rocker D′, or to the lower frame of the vehicle, by means of bolt-joints, in the usual manner, and at their other ends are attached to the body A by brackets, in such a manner as to carry the weight of the body and load, holding the rubbers in the springs in a state of compression. The lower frame of the vehicle has two or more parallel longitudinal bars, E E, firmly secured to the upper part of the hinder axle-tree D and rocker D′, and strengthened by a cross-girt, F′, in the center; and there are also two metal braces or rods, F F, extending diagonally from the corners to the center, the rods F F being firmly secured to the lower sides of the hinder axle-tree D and rocker D′, and also to the cross-girt F′ in the center, the whole performing the function of a perch for coupling the head-block and hind axle to prevent the axle-tree D or rocker D′ from being turned over by the action of the springs and load. On each side of the lower frame, in the center of its length, is a side brace or link, $C^2$, secured to the lower frame, and also to the body A of the vehicle, to prevent the body from being tipped sidewise, as in getting in or out. This brace $C^2$ is made of metal, and consists of two brackets and an intermediate link. The brackets are secured to the frame and body, respectively, and the bolt-holes in the link, by means of which it is attached to the brackets, are elongated to permit some freedom of motion when not in action. The body A of the vehicle consists of a light wooden frame, A′, and seat B, with iron braces to assist in supporting the seat, and also to give form to the covering. The form of this may be varied to suit the taste, and, if desired, a top may be added. The covering may be leather, varnished cloth, or other suitable material. The space below the seat B is shown as having no floor, but may be floored or covered with a lattice or woven wire for the reception of packages or light articles.

Having thus described my invention, I claim as new and desire to secure by Letters Patent—

1. The combination, in a vehicle, of the body or bed, the running-gear, and interposed compressible boxed springs, connected by suspension-arms or brackets, substantially as and for the purpose specified.

2. The combination of frame E E F′, axle D, and rocker D′ with the springs C and median brackets, connected by links $C^2$, to support a vehicle-body, as shown and described.

In witness whereof I, the said LUCIUS A. FOGG, have hereunto set my hand.

LUCIUS A. FOGG.

Witnesses:

JAMES I. KAY,

F. W. RITTER, Jr.